Patented Mar. 28, 1933

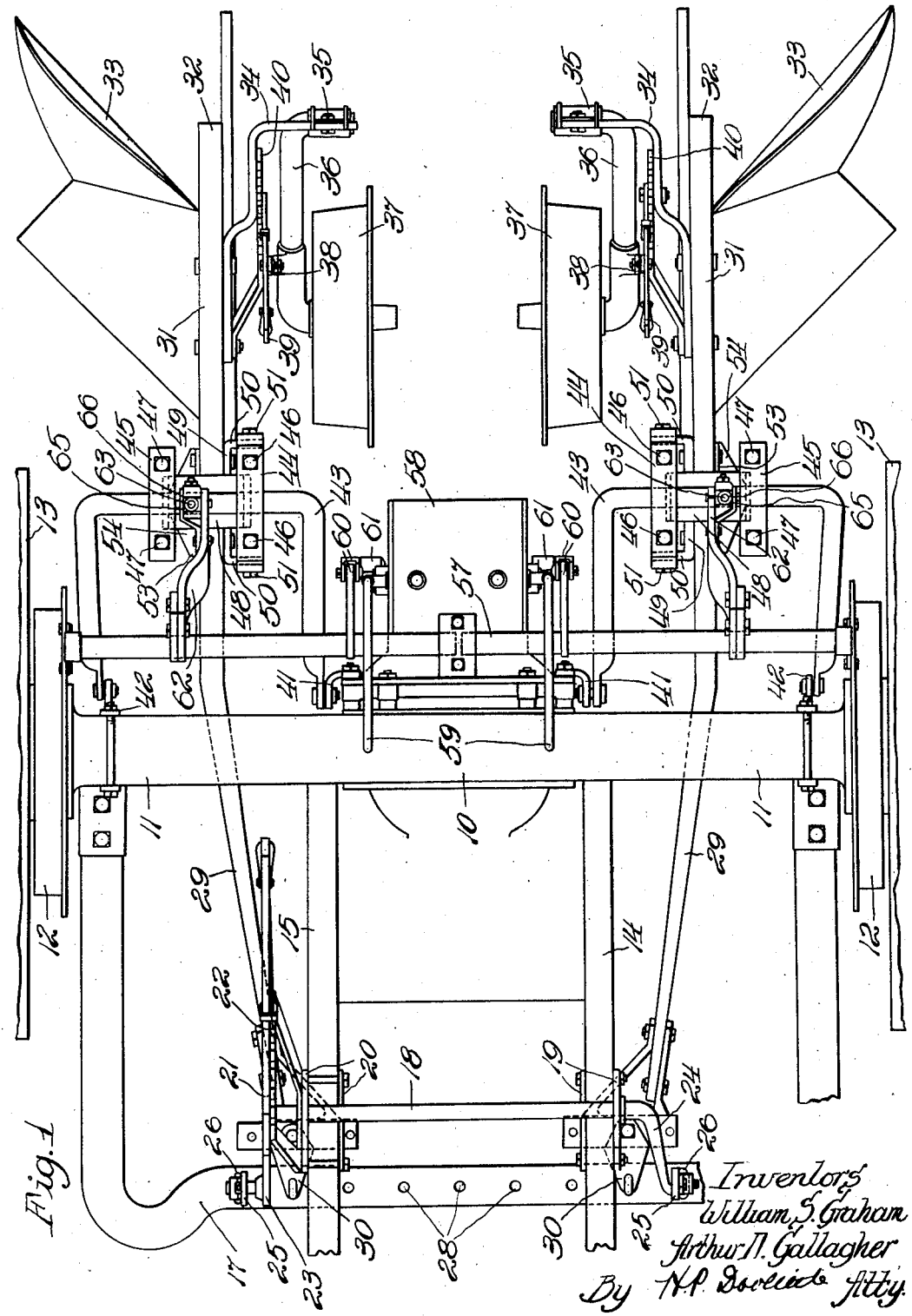

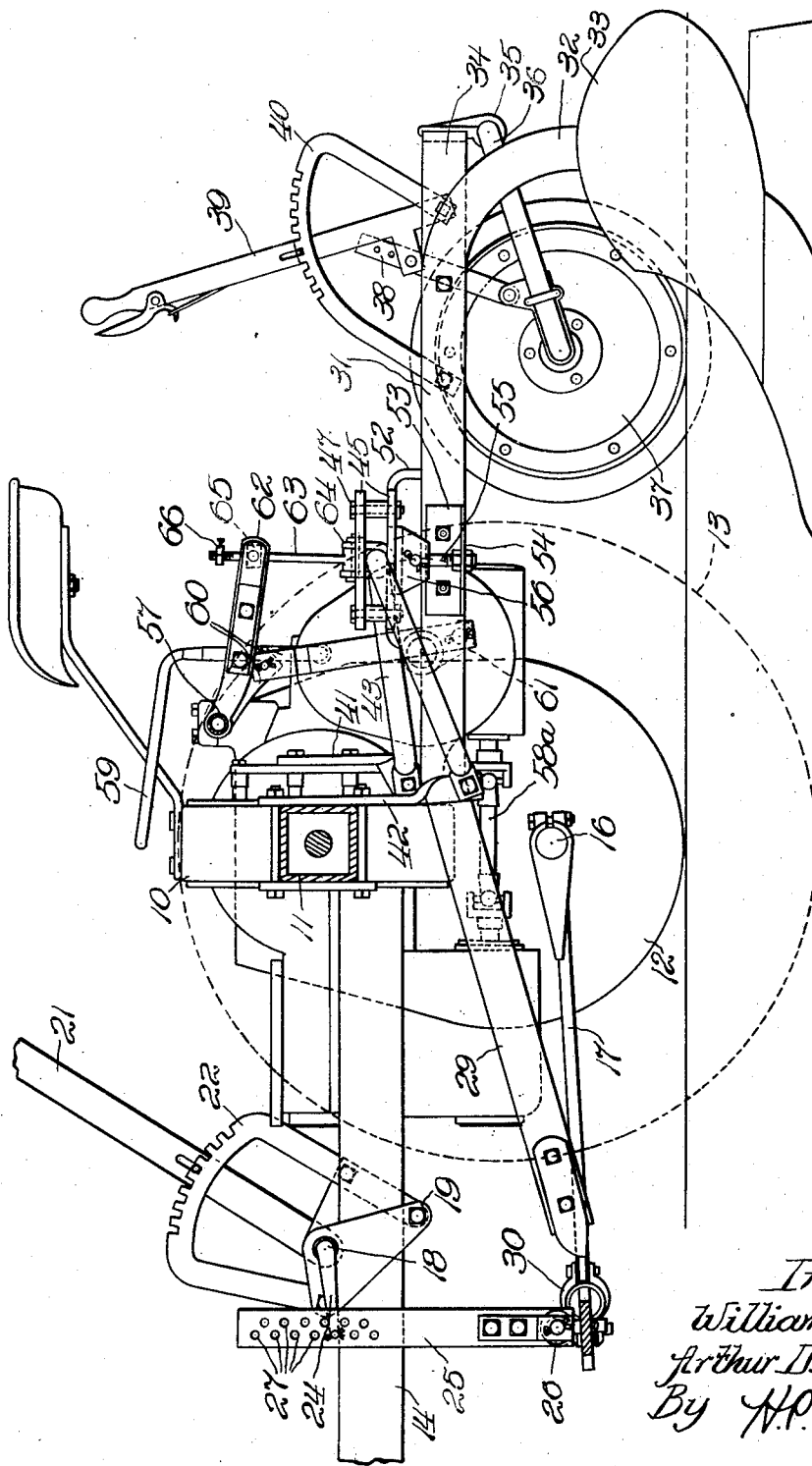

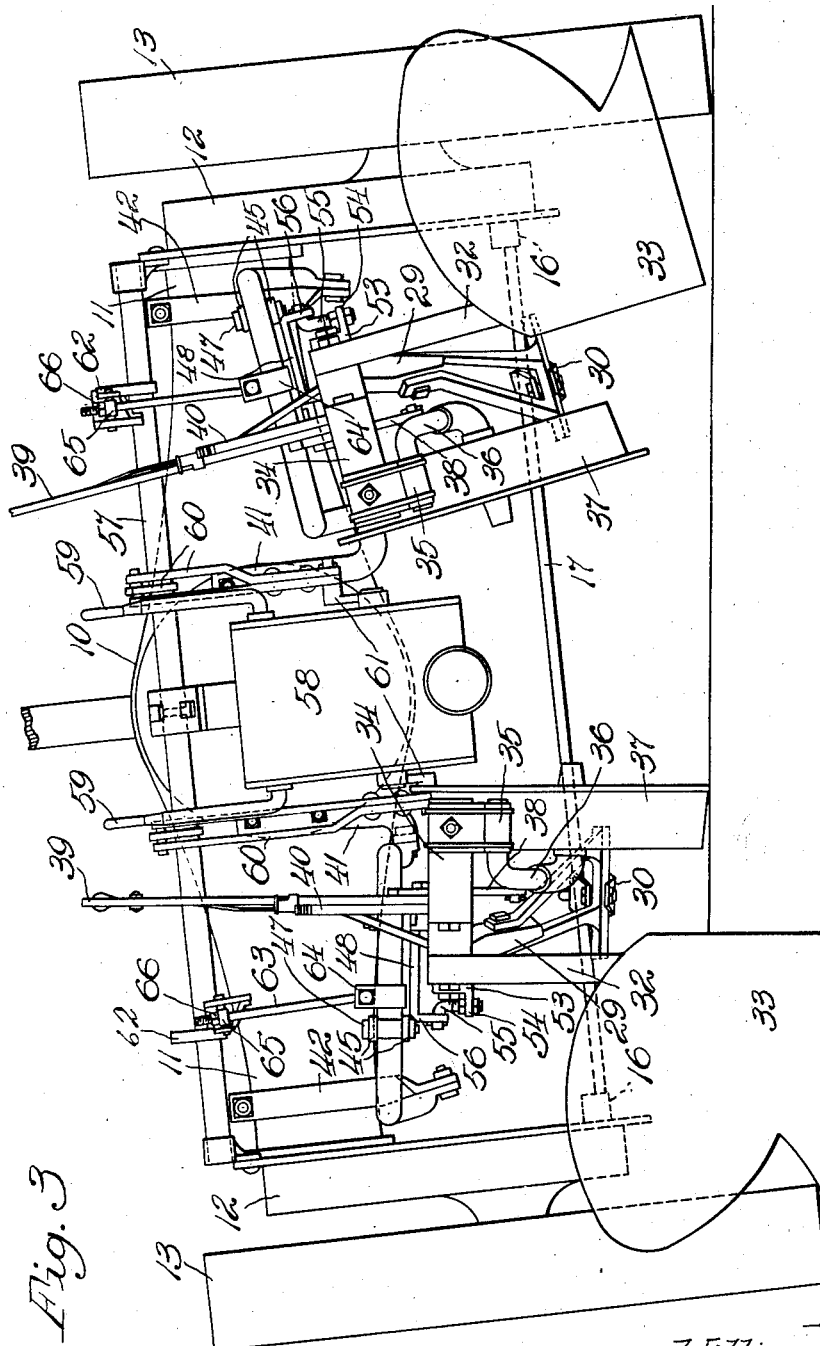

1,902,845

UNITED STATES PATENT OFFICE

WILLIAM S. GRAHAM AND ARTHUR D. GALLAGHER, OF CANTON, ILLINOIS, ASSIGNORS TO INTERNATIONAL HARVESTER COMPANY, A CORPORATION OF NEW JERSEY

TRACTOR PLOW

Application filed August 19, 1931. Serial No. 558,034.

This invention relates to directly connected, or tractor carried, plow attachments for tractors, and particularly to a two-way plow attachment of this type.

The main objects of the invention are to simplify the structure of plow attachments of the character stated while embodying in the simplified structure means for effecting required adjustments of the plow to meet various plowing conditions; for permitting the plow to float or follow the variations in the ground surface independently of the up and down movements of the tractor; and for lifting and lowering the plow or plows.

From a more specific aspect, the object of the invention is to provide a two-way plow attachment having the advantages above stated, particularly designed for mounting on a so-called row crop tractor of the type having an upright, arched, rear axle structure, thus permitting the plow or plows to be mounted in close coupled relation to the tractor and to be carried on the axle structure when not in use.

The foregoing and other objects and advantages will be apparent from the following detailed description of a preferred embodiment of the invention, and, although the invention is illustrated and described as embodied in a two-way plowing apparatus, it is nevertheless not limited to this particular use, as the invention actually resides in the organizations and details of construction particularly defined in the appended claims.

A tractor plow embodying the invention is illustrated in the accompanying drawings, where:

Figure 1 is a plan view showing the rear portion of a tractor having the plow attachment mounted thereon;

Figure 2 is a side elevation of the same structure with the axle and draft bar shown in section; and, Figure 3 is a rear elevation of the same with the apparatus shown in working position.

The invention is illustrated as in combination with a tractor of the type having a wide tread, rear axle comprising an upright, arched axle structure having a central enlargement or differential housing 10 from which there are lateral extensions 11 constituting the axle housings. On the ends of the axle housings there are secured depending end housings 12 on the outer faces of which the traction wheels 13 are mounted. A central, forwardly extending tractor body including side sills 14 and 15 is secured to the axle structure and carries the usual power plant, clutch and transmission gearing. At points directly below the transverse portion of the axle structure, the inner sides of the depending housings 12 are provided with inwardly extending pintles 16 which serve as pivots for a forwardly extending U-shaped draft frame 17. A rock-shaft 18 is mounted in brackets 19 and 20 secured to the side sills 14, 15 at points spaced forwardly of the axle structure and near the cross member or forward end of the U-shaped draft frame. At one end, the rockshaft 18 has secured thereto an upwardly extending hand lever 21 cooperating with the usual locking rack 22 forming part of the bearing bracket 20.

Crank arms 23 and 24 are provided on the respective ends of the rockshaft 18 and these are connected through suspension links 25 to the transverse portion of the U-shaped frame through pivot eyes 26. The suspension links 25 are preferably provided with a vertical series of openings 27 at the upper ends for selective connection with the crank arms 23 and 24 to vary the effective length of the links. Oscillation of the rockshaft 18 by means of lever 21 will effect vertical adjustment of the draft frame about its transverse axis on the pintles 16, in an obvious manner. The transverse or bight portion of the draft frame 17 is provided with a series of spaced apertures 28 for reception of the draft connections of rearwardly extending plow beams. In the present instance two such plow beams are illustrated at opposite sides of the central longitudinal axis of the tractor, the beams carrying oppositely facing plows and the arrangement being such as to constitute a two-way plow. As the plow supporting structure at each side of the tractor is identical, one only will be described.

Each plow attachment, therefore, comprises a beam having a downwardly and inwardly directed forward portion 29 pivoted at its forward end to a clevis 30, which is in turn pivoted on the draft bar 17 in one of the openings 28. The pivotal connections, while on vertical axes, are sufficiently loose to permit the necessary vertical movement of the beams during lifting and lowering of the plows. The forward portion 29 of the plow beam extends forwardly of the axle structure, as shown, and is continued rearwardly as a straight, substantially horizontal beam portion 31 terminating in the usual downwardly curved standard 32 on which the plow body 33 is secured. At the rear end of the beam there is secured a laterally extending bracket 34, which projects towards the land side of the plow. The rear end of this bracket is provided with a horizontal sleeve 35 in which there is journaled the upper end of a crank shaft 36, the lower end of which has journaled on it a land or gauge wheel 37, which is preferably of the flanged construction shown, so as to resist side thrust. The crank axle 36 is connected through a link 38 with a hand lever 39 pivoted on the bracket 34 and having a locking rack 40 for the purpose of adjusting the position of the gauge wheel and thereby the penetration of the plow.

At laterally spaced points on the axle housing between the differential housing 10 and the depending end housing 12 at each side of the tractor, there are secured depending hanger members 41 and 42, the lower ends of which are provided with pivot openings for the reception of pivot bolts supporting the arms of rearwardly extending bail cranks 43. The arms of each bail crank 43 are offset with respect to one another and the pivots to the respective hanger bars 41, 42 are so positioned that the bight portion of the bail crank is at an acute angle to the longitudinal transverse axis of the axle housings; that is to say, the bail cranks are disposed on lines diverging upwardly from the central longitudinal plane of the tractor to such a degree that, when a plow is in lowered or working position, as illustrated in Figure 3, and one of the tractor wheels is in the furrow, the plow beam, plow, and land wheel will be in substantially vertical position, as there shown.

The bight portion of the bail 43 is positioned immediately above the plow beam at a point between the ends of the beam and preferably nearer the rear end thereof, and the bail crank is pivotally connected to the portion 31 of the beam by a support or saddle composed of two pairs of vertically spaced flat bars or straps 44 and 45 connected by spacer bolts 46 and 47. The bail is loosely seated between the straps and the two pairs are spaced apart laterally so as to engage the mid portion, or bight, of the bail at laterally spaced points. A plate 48 connects the two pairs of straps beneath the bail, and the plow beam is located just below this plate between the two pairs of straps. The beam is suspended by means of a bracket piece 49 secured to the inner, or land, side of the beam, having laterally extending ears 50 at the ends which are pivotally connected at 51 (Figure 1) to similar depending ears 52 (Figure 2) formed on the lower strap of the pair 44 at that side. On the opposite side, the beam has a bracket piece 53 fixed to it, which has a horizontal flange 54. This flange has an opening to receive the threaded lower end of a bolt 55 (Figure 3) which is bent at its upper end to provide an angular extension received in an opening in an ear 56 depending from the plate 48. Adjusting nuts engage opposite sides of the flange 54, and adjustment of these nuts on the threaded end of bolt 55 will cause the plow beam to be tilted on its pivot at 51 on the opposite side of the beam. This construction provides a tilting or leveling adjustment for the plow and, when adjusted, it is held against tilting.

As the preferred means for lifting and lowering the plow at each side of the tractor, there is provided a two part rockshaft 57, which is suitably journaled on the upper portion of the axle structure back of the axle housing. Each lateral half of the rockshaft 57 can be separately oscillated through the medium of a double power lift mechanism contained in a casing 58 carried by the differential housing of the axle structure and driven by a power shaft 58ª driven through the transmission, the lift mechanism being controlled by trip levers 59 at each side thereof. The power lift mechanism referred to is not specifically a part of the present invention, but is preferably that more specifically described and claimed in assignee's co-pending application Serial No. 540,142 filed May 26, 1931.

Each section of the rockshaft 57 is connected by means of a crank arm and link 60 to a crank 61 of the power lift device, and each section is provided between its ends with a rearwardly extending lift arm 62 extending above the bail crank 43 and connected thereto by a lift or pick-up link 63, pivoted to a collar 64 on the bight portion of the bail between the saddle straps 44, 45, and which has its upper end passing loosely through a pivoted collar 65 suitably mounted on the end of the lift arm 62. The arrangement is such that, when the plow is in lowered position, as in Figure 3, the collar 65 will have traveled down the lift rod 63 a sufficient distance to provide for lost motion between the collar 65 and a stop nut 66 on the upper end of the lifting rod 63, thereby allowing the plow to have a certain amount of unrestricted vertical floating movement with respect to the tractor.

With the construction above described, a simple form of plow attachment is provided, in which there is capacity for adjustment at the front end and the rear end of the plow beam to meet all requirements of different soil conditions and depths of plowing, and also a lifting means which includes provision for adjustment of tilt and for floating movement of the plow independently of up and down movements of the tractor.

The invention obviously permits of variations in details of construction without departure from the scope thereof as defined in the following claims.

What is claimed is:

1. The combination with a tractor comprising a rear axle structure, of a plow having a beam extending forwardly below the axle, a vertically adjustable draft connection between the forward end of the beam and the tractor, a vertically adjustable land wheel on the plow beam, and lifting and lowering means on the axle structure connected to the plow beam substantially midway between its ends, said connection including pivots for adjustment of the beam and plow about a longitudinal and a transverse axis.

2. The combination with a tractor comprising a rear axle structure supported at each end on traction means, of a plow having a beam extending forwardly below the axle, a vertically adjustable draft connection between the forward end of the beam and the tractor, a vertically adjustable land wheel on the plow beam, and means on the axle structure for lifting and lowering the plow comprising a rearwardly extending bail-shaped crank having its arms pivoted on the axle structure on a transverse axis, means on the axle structure for swinging said bail crank including a lifting link connected to the mid portion of the bail crank, a saddle piece having spaced members embracing the mid portion of the bail crank at opposite sides of the lifting link, and depending elements on the saddle piece secured to the plow beam between its ends and having means for adjusting the lateral tilt of the plow beam.

3. The combination with a tractor having an upright arched rear axle structure including depending end housings having traction wheels mounted on the outer sides thereof, of a forwardly extending U-shaped draft frame having its arms pivoted to the inner sides of the respective depending housings on a horizontal axis, means on the tractor for adjusting the draft frame about said axis, a rearwardly extending bail-shaped crank having its arms pivoted on the axle structure on a transverse axis located above the axis of the draft frame, a plow having a beam pivotally connected between its ends to the bight portion of the bail crank and having its forward end connected to the forward portion of the draft frame, and means on the axle structure for oscillating the bail crank to raise and lower the plow.

4. The combination with a tractor having an upright arched rear axle structure including depending end housings having traction wheels mounted on the outer sides thereof, of a forwardly extending U-shaped draft frame having its arms pivoted to the inner sides of the respective depending housings on a horizontal axis, means on the tractor for adjusting the draft frame about said axis, a rearwardly extending bail-shaped crank having its arms pivoted on the axle structure on a transverse axis located above the axis of the draft frame, a plow having a beam pivotally connected between its ends to the bight portion of the bail crank and having its forward end connected to the forward portion of the draft frame, and means included in the connection between the plow beam and the bail crank for adjusting the lateral tilt of the plow.

5. The combination with a tractor having an upright rear axle structure including depending end housings having traction wheels mounted on the outer sides thereof, of a forwardly extending U-shaped draft frame having its arms pivoted to the inner sides of the respective depending housings on a horizontal axis, a rockshaft on the tractor above the draft frame and forward of the axle structure having crank arms connected to the bight portion of the draft frame, means for turning the rockshaft to adjust the draft frame on its pivotal connections, a plow having a beam connected at its forward end to the bight portion of the draft frame, a vertically swingable beam support mounted on the axle structure to which the plow beam is connected, and means on the axle structure for swinging said support to raise and lower the plow.

6. The combination with a tractor having an upright arched rear axle structure comprising a central differential housing, lateral axle housings extending therefrom and depending end housings on the ends of the axle housings having traction wheels mounted on the outer sides thereof, of a vertically adjustable draft member mounted on the tractor forward of the axle structure, a bail crank pivotally supported on the axle structure and located between the differential housing and the adjacent depending housing, said bail crank being pivoted on a transverse axis extending at an acute angle to the transverse longitudinal axis of the axle housings, a plow having a beam pivotally supported between its ends on said bail, a draft connection between the front end of said beam and the draft member, a vertically adjustable land wheel carried by the rear end of the plow beam, and means on the axle structure for oscillating the bail crank to raise and lower the beam.

7. The combination with a tractor having an upright arched rear axle structure comprising a central differential housing, lateral axle housings extending therefrom and depending end housings on the ends of the axle housings having traction wheels mounted on the outer sides thereof, of a forwardly extending U-shaped draft frame having its arms pivoted to the inner sides of the respective depending housings on a horizontal axis, means on the tractor for adjusting the draft frame about said axis, bail-shaped cranks pivotally supported on the axle structure at each side of the differential housing on transverse axes located above the axis of the draft frame, a pair of plows having beams pivotally connected at their forward ends to the bight portion of the draft frame and pivotally connected between their ends to the respective bail cranks, and means on the axle structure for separately oscillating the bail cranks to thereby lift and lower the plows.

In testimony whereof we affix our signatures.

WILLIAM S. GRAHAM.
ARTHUR D. GALLAGHER.